United States Patent
Sarr

(10) Patent No.: US 7,026,637 B2
(45) Date of Patent: Apr. 11, 2006

(54) METHOD AND SYSTEM FOR MEASURING RUNOUT OF A ROTATING TOOL

(75) Inventor: Dennis P. Sarr, Covington, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 10/607,754

(22) Filed: Jun. 26, 2003

(65) Prior Publication Data

US 2005/0006570 A1   Jan. 13, 2005

(51) Int. Cl.
*G01V 8/00* (2006.01)

(52) U.S. Cl. ............... 250/559.23; 356/602; 702/157; 702/172

(58) Field of Classification Search ........... 250/559.23; 356/602, 606, 237.2, 631; 382/203; 702/155, 702/157, 167, 172
See application file for complete search history.

(56) References Cited

U.S. PATENT DOCUMENTS

| | | | | |
|---|---|---|---|---|
| 4,417,147 A | * | 11/1983 | Faville | 250/559.14 |
| 4,460,869 A | * | 7/1984 | Buser et al. | 324/200 |
| 5,005,978 A | * | 4/1991 | Skunes et al. | 356/625 |
| 5,140,534 A | * | 8/1992 | Miller et al. | 700/279 |
| 5,224,272 A | * | 7/1993 | Toraason et al. | 33/504 |
| 5,359,885 A | * | 11/1994 | Ohms | 73/146 |
| 5,558,692 A | * | 9/1996 | Chervenak et al. | 65/382 |
| 5,863,136 A | * | 1/1999 | Miyazaki | 384/512 |
| 6,757,636 B1 | * | 6/2004 | Bluestein | 702/155 |

* cited by examiner

*Primary Examiner*—David Porta
*Assistant Examiner*—Davienne Monbleau
(74) *Attorney, Agent, or Firm*—Black Lowe & Graham PLLC

(57) ABSTRACT

A method, system, and computer program product for measuring runout of a rotating tool are provided. A rotating tool is illuminated with a coherent electromagnetic radiation. The tool has an axis and a reflective surface, and completes a rotation in one period. The surface has a radial displacement from the axis of the rotating tool. A path, of coherent electromagnetic radiation reflected from the reflective surface is sensed. A maximum radial displacement is determined based upon the sensed path and a minimum radial displacement is determined based upon the sensed path. A runout is determined based upon the difference between the maximum radial displacement and the minimum radial displacement. A tool edge margin can be measured by analysis of specific areas of the rotating tool.

11 Claims, 4 Drawing Sheets

METHOD AND SYSTEM FOR MEASURING RUNOUT OF A ROTATING TOOL

FIELD OF THE INVENTION

This invention relates generally to measurement technology and, more specifically, to measurement of runout.

BACKGROUND OF THE INVENTION

Runout is the measure by which a rotating shaft deviates from being truly round. Runout is generally characterized by the difference between a highest and lowest point on the shaft as it rotates through one revolution.

Runout of a rotating tool is traditionally measured by placing a dial indicator in contact with the surface of a shaft of the tool. The shaft is then slowly turned as the range of values indicated on the dial is observed. Subtracting a lowest value from a highest value determines the runout.

Traditional means often requires the tool to be held in a pin vise or a chuck held on a machinist's bench rather than in the chuck of a motor drive for rotating the tool. Moving the tool from a bench to the tool is time consuming and slows production of product requiring the rotating tool. A better means would allow measurement of runout in place in the chuck of the motor drive.

Measuring as the tool is rotated by the motor drive at the higher speeds generally used for production is desirable. Observing runout at various speeds may indicate vibrations within the tool generated by imbalances that would not be evident in traditional (static) testing. Thus, a tool that might otherwise appear to be within tolerance by static testing might prove to be unsatisfactory in operation. Testing at operating speeds eliminates the likely spoilage of product due to imperfections not detected otherwise.

Attempting to test a rotating shaft with a dial indicator will because of the friction at the point where the indicator bears on the shaft and the high speed of the rotating surface at which it bears, tend to fling the dial indicator away from the shaft causing a hazard. Additionally, accurate measurement is not possible because of a phenomenon known as float. As the bearing surface of the dial indicator passes over a lower spot in the shaft, the indicator might not react quickly enough to remain in contact with the surface. The result is to miss a measurement on the low spot thus giving the resulting measurement an indication of lesser runout than is present.

Measurement of a fluted cutting tool is very difficult by this means as well. The cutting edges of the tool tend to catch the tip of the dial indicator as it turns. Further, the flutes defined by the surface tend to allow the tip into the flute causing inaccuracy. Often the cutting edges will destroy the tip of the dial indicator.

Manufacturers such as Keyence® produce laser measuring-heads that accurately measure small displacements of reflective surfaces. The laser measuring-heads exploit a process known as triangulation. By shining a coherent laser beam incident to a reflective surface and then measuring the geometry of the reflected beam with respect to the incident beam, the location of the surface is determined. Such laser measuring-heads are used to measure displacement without actually making contact with the surface measured. For instance, where the metal foil output of a rolling mill must be measured for consistency of thickness, a laser measuring-head may be used to measure the height of the surface as the foil leaves the mill.

Thus, there is an unmet need in the art for using a laser measuring-head to accurately measure of runout of a rotating tool.

SUMMARY OF THE INVENTION

A method, a system, and a computer program product for measuring runout of a rotating tool are provided. A rotating tool is illuminated with a coherent electromagnetic radiation. The tool has an axis and a reflective surface, and completes a rotation in one period. The surface has a radial displacement from the axis of the rotating tool. A path of coherent electromagnetic radiation reflected from the reflective surface is sensed. A maximum radial displacement is determined based upon the sensed path, and a minimum radial displacement is determined based upon the sensed path. A runout is determined based upon the difference between the maximum radial displacement and the minimum radial displacement.

One embodiment of the present invention provides a computer software program product. The computer program procedure instructs a processor to determine a runout of a rotating tool based upon a signal from a transducer. A buffer address assignment instructs the processor to store an instantaneous value of a signal from a transducer in signal communication with the processor at a memory address. The memory address is associated with a time of the instantaneous value. The transducer is configured to measure a displacement of a surface of a rotating tool. A pattern recognizer is configured to retrieve the stored instantaneous values along with the associated times. The pattern recognizer is configured to recognize, from the stored instantaneous values and associated times, an ordered plurality of instantaneous values that are regularly and substantially repeating. The plurality of instantaneous values is a pattern. A comparer is configured to select a least value from the pattern and further configured to select a greatest value from the pattern. An arithmetic engine is configured to determine a difference between the greatest value and the least value. An output driver indicates the difference.

In accordance with further aspects of the invention, an averaging filter is configured to receive the pattern from the pattern recognizer. The averaging filter designates a first number representing the number of instantaneous values in the pattern and designates a second number less than the first number and greater than one. The second number used to create a pane for performing a rolling averaging. The averaging engine performs a rolling averaging of the instantaneous values in the pattern. The rolling averaging results in a plurality of averaged values. The averaging filter substitutes the averaged values for the instantaneous values in the pattern such that the comparer will select a least averaged value and a greatest averaged value. The arithmetic engine then computes a difference.

As will be readily appreciated from the foregoing summary, the invention provides a method and a system for measuring runout of a rotating tool.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, a method, a system, and a computer program product for measuring runout of a rotating tool are provided. A rotating tool is illuminated with a coherent electromagnetic radiation. The tool has an axis and a reflective surface, and completes a rotation in one period. The surface has a radial displacement from the axis of the rotating tool. A path of coherent electromagnetic radiation reflected from the reflective surface is sensed. A maximum radial displacement is determined based upon the sensed path, and a minimum radial displacement is determined based upon the sensed path. A runout is determined based upon the difference between the maximum radial displacement and the minimum radial displacement.

Figure 1:
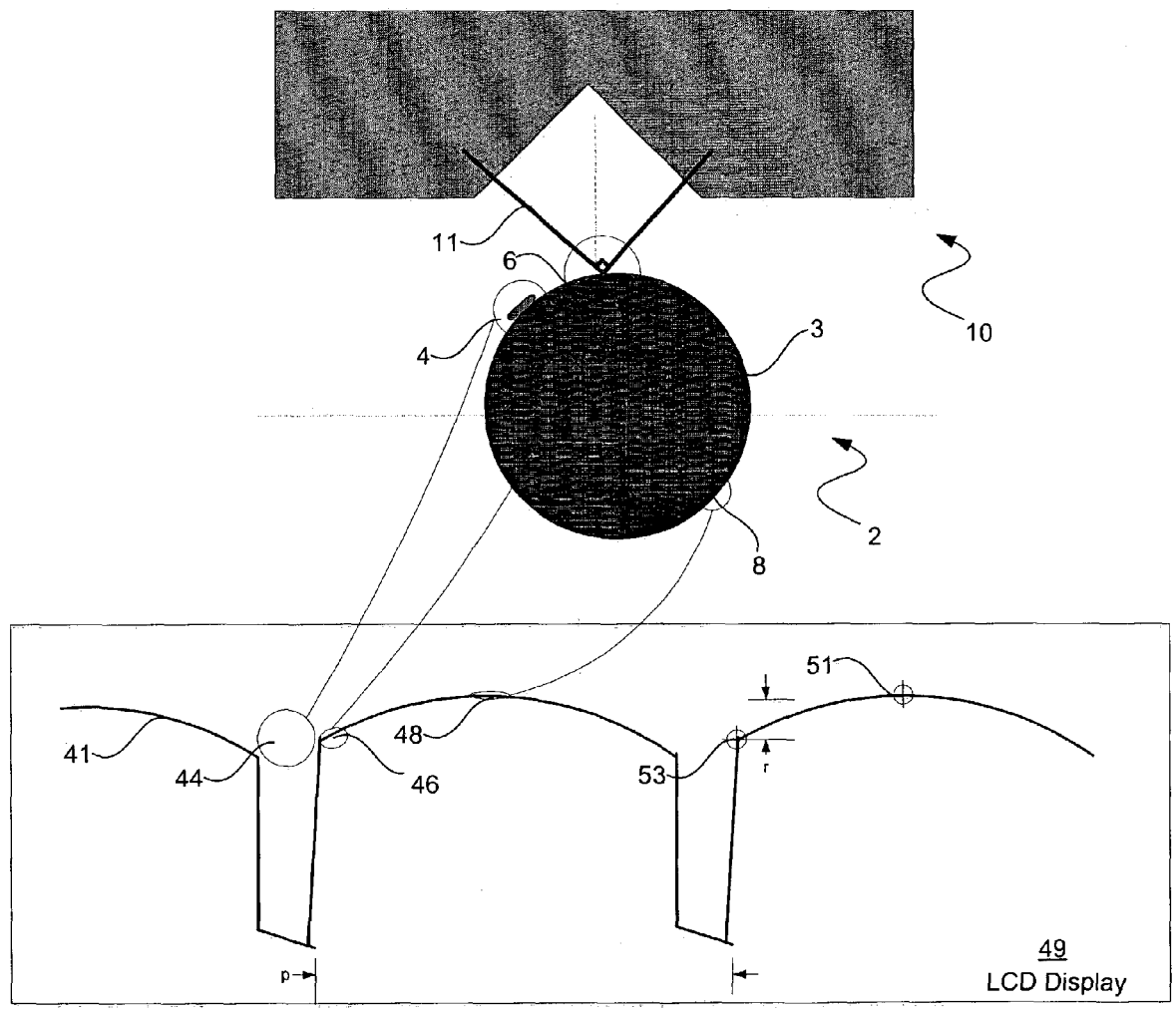
FIG. 1 is a block diagram of sensor arrangement and output of a system.

FIG. 1 is a block diagram of the sensor arrangement and output of a system 1 for measuring runout of a surface 3 of a rotating tool 2. The rotating tool 2 is generally cylindrical with an axis (going into and out of the page), such that the surface 3 forms a circular cross-section. Given by way of non-limiting example, the tool 2 may be a cutter head, drill bit, hole saw, or the like. Three features of the surface 3 are shown for purpose of discussion: an indexing mark 4, a minimum displacement 8 from the axis, and a maximum displacement 6 from the axis. The index mark 4 suitably is any sort of mark, including without limitation a scribed line parallel to the axis of the tool. One presently preferred embodiment uses a paper shim removably attached to the surface 3 so that a technician may suitably position the indexing mark 4 between the minimum displacement 8 and the maximum displacement 6 without obscuring either from measurement.

To measure the surface 3 in terms of its displacement from the axis, a sensor head 10 sends a beam 11 of coherent radiation to strike incident to the surface 3 and then to reflect back to the sensor head 10. In one presently preferred embodiment, the beam 11 is a laser beam. Measurement of the geometry of the beam 11 in its path indicates the displacement of the surface 3. The sensor head 10 sends a signal representative of the displacement to a processor 12 (FIG. 3) where the displacement is displayed on an output screen 49 (FIG. 1). A representative tracing 41 shows the displacement as a continuous function (though the tracing is oriented to display displacement from the sensor head 10 rather than from the axis resulting in the highest spots on the surface 3 showing as the lowest displacement from the measuring head 10). The paper shim used as the indexing mark 4 passes close to the sensor head 10 and is indicated by the local minima 44. The maximum displacement 6 occurs near the indexing mark 4, and is shown at a point 46. The minimum displacement 8 is shown at a point 48. Because the function is cyclic, the value at the point 46 recurs at a point 53, one period p later. Similarly, the value at the point 48 recurs at a point 51, also one period p later.

Runout is the difference between displacement value at the position of maximum displacement 46 and 53 and minimum displacement 48 and 51. Therefore, the difference between a height at a point 53 and a height at a point 51, is a runout of the rotating tool 2.

Figure 2:
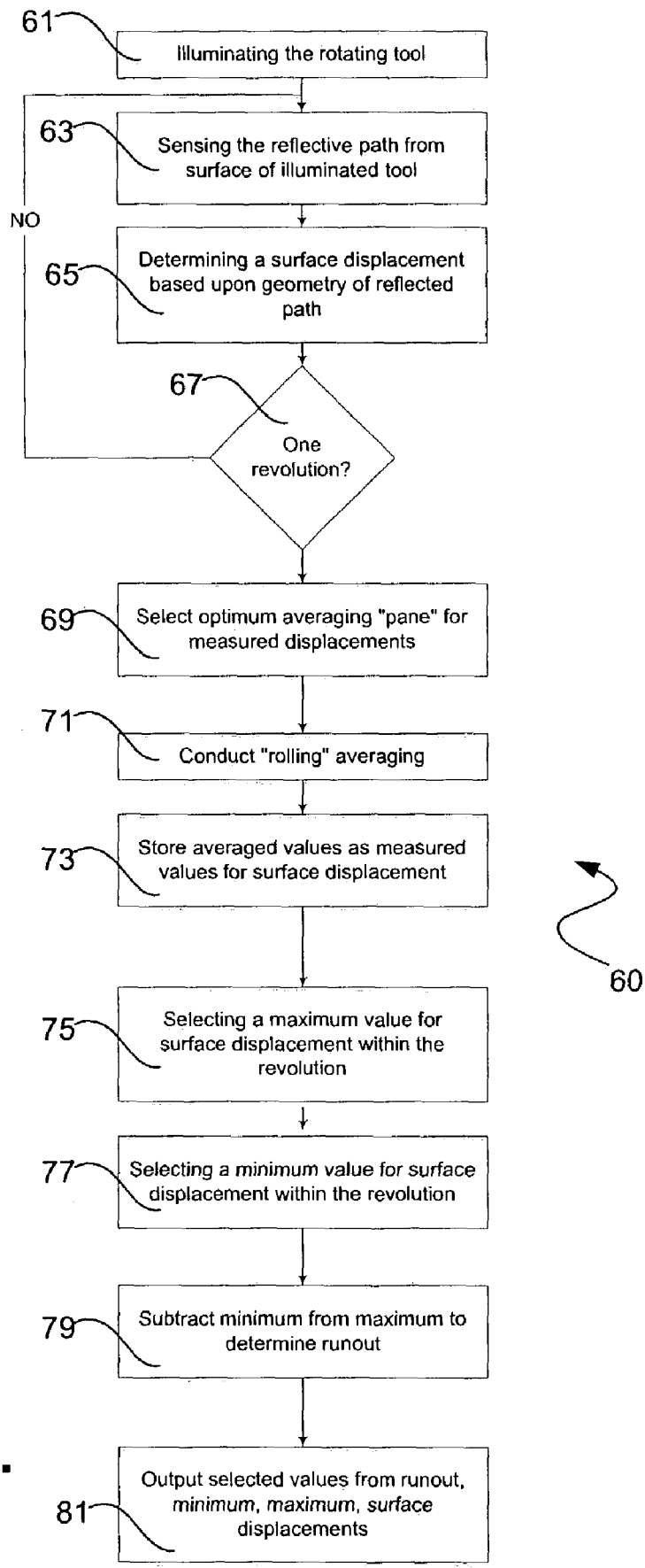
FIG. 2 is a flowchart of a method for determining runout of a rotating tool.

Referring to FIGS. 1 and 2, a routine 60 determines runout of the rotating tool 2. The rotating tool 2 is illuminated at a block 61 by a coherent radiation source, preferably a laser beam 11. The laser beam 11 is reflected from the surface 31 back to the sensor head 10. The position and direction of the beam 11 (the reflective path) as it reenters the sensor head 10 indicates the displacement of the surface 3. The reflective path is sensed at a block 63. The sensed reflective path determines displacement of the surface 3 at a block 65 where the value for the displacement of the surface 3 is stored in association with a value representing the time of the measurement.

The values of the measurements repeat cyclically as the rotating tool 2 turns. Several suitable means exist to determine a set of values representing a complete revolution of the rotating tool 2. One presently preferred method includes sensing the occurrence of the local minimum 44 occurring at the indexing mark 4. Another suitable means is by sensing the substantial repetition of measured values. As various conditions occur that degrade the measured value derived by the sensor head 10, such as line noise, synchronization problems, and capacitive and inductive errors in leads, the pattern will be recognized principally by substantial rather than exact similarity in each revolution. This process is known in the art and has been employed in, among other fields, the design of oscilloscopes. Where an armature position of a motor drive driving the rotating tool 2 is known, that position will define the period p of a single rotation of the rotating tool 2.

In order to eliminate the effects of conditions known to degrade the measured value derived by the sensor head 10, an averaging process is advantageously employed. A determination is made at a decision block 67 if a number of measured values represents one revolution. An optimum subset of these values is known as a pane. If not, the routine 60 returns to the block 63. If so, a number of members in the pane is suitably selected at a block 69.

A rolling average is derived by substituting an average value across a pane centered at a single measurement in question. Thus, where the value of a pane is suitably selected to be two, the measurement in question, as well as a measurement just prior to and just subsequent to the measurement in question, are averaged and the average is substituted for the measurement in question.

A rolling average is performed on the measured values of the revolution at a block 71 using the pane defined at the block 69. Averaging is more desirable than instantaneous measurement because noise is generally random, occurring with equal likelihood of reducing or enhancing the measured value. By averaging the measured values, those measured values that are less than the true displacement of the rotating tool 2 will cancel those measured values that are greater than the true displacement of the rotating tool 2.

Another suitable averaging routine may also be suitably employed. Where values substantially repeat as between the point 46 and later the point 53, and similarly between the point 48 and later the point 51, the averaging can occur between the several values that represent corresponding points in each period p of revolution. The averaging, then, can be performed across a pane that represents a number of periods averaging for each distinct point in the period. While two routines for averaging have been discussed, the former is presently preferred for averaging. This is because in the latter, harmonics that may cause deformation of the tool at a given rotational speed may, in turn, be averaged out of the measured values resulting in loss of important information.

Figure 4:
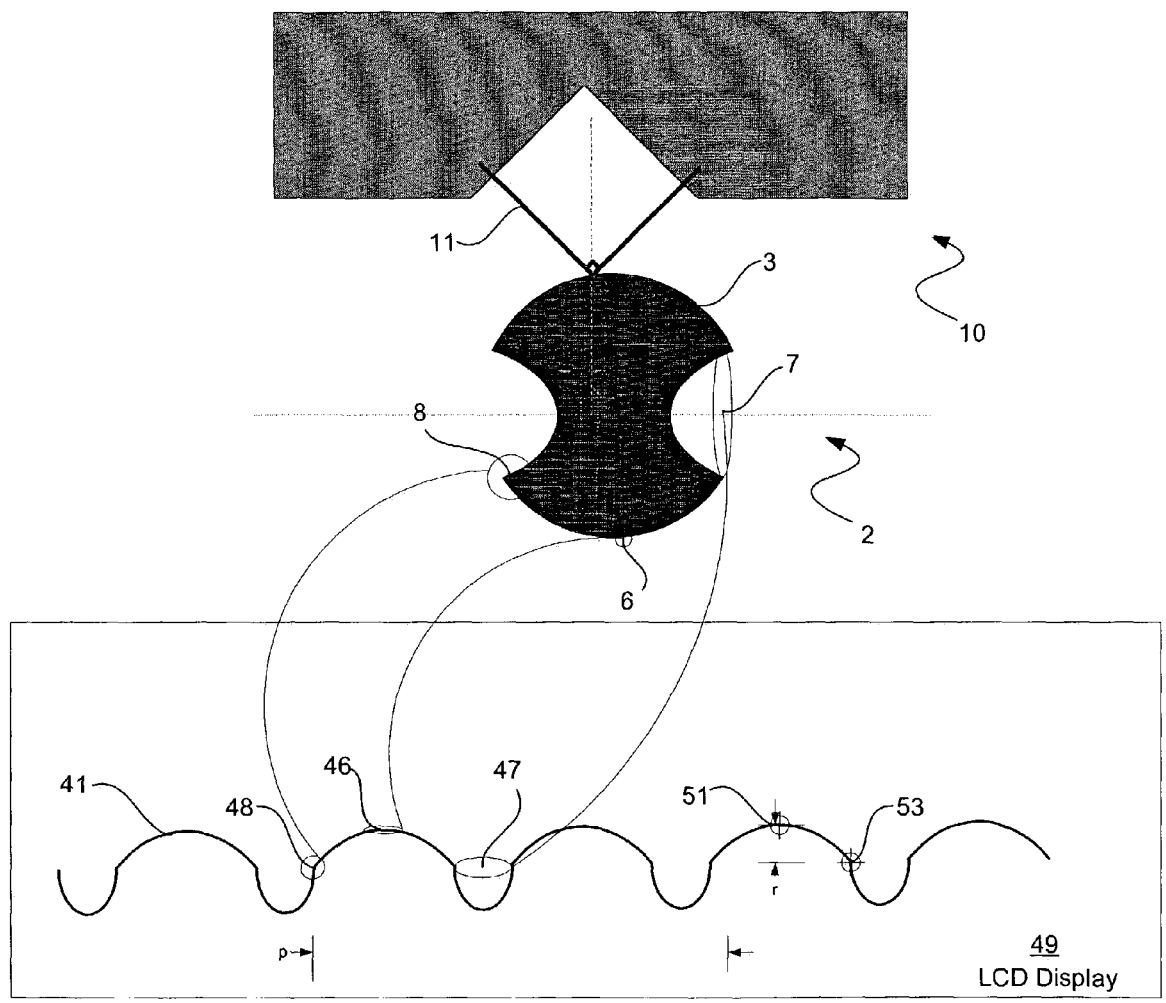
FIG. 4 is a block diagram of the sensor and output of a system on a drill's edge margin.

Referring to FIG. 4, the measuring head 10, may be suitably employed to analyze a fluted drill. FIG. 4 is a block diagram of the sensor arrangement and output of a system for measuring runout of a surface 3 of a rotating tool 2. The rotating tool 2 is generally cylindrical with an axis (going into and out of the page), such that the surface 3 forms a circular cross-section. Three features of the surface 3 are shown for purpose of discussion: a flute 7, a minimum displacement 8 from the axis, and a maximum displacement 6 from the axis. In the analysis of the edge margin of a drill (two fluted) the points 46 and 48 would represent the cutting edge margin area of the drill. The measured values for these measurements can be stored in computer memory 21 for analysis by arithmetic engine 29 for display on output screen 31. As mentioned previously, this can be applied to the measurement of parts with a multiple of cutter edges and to the measurement of gear teeth.

Figure 3:
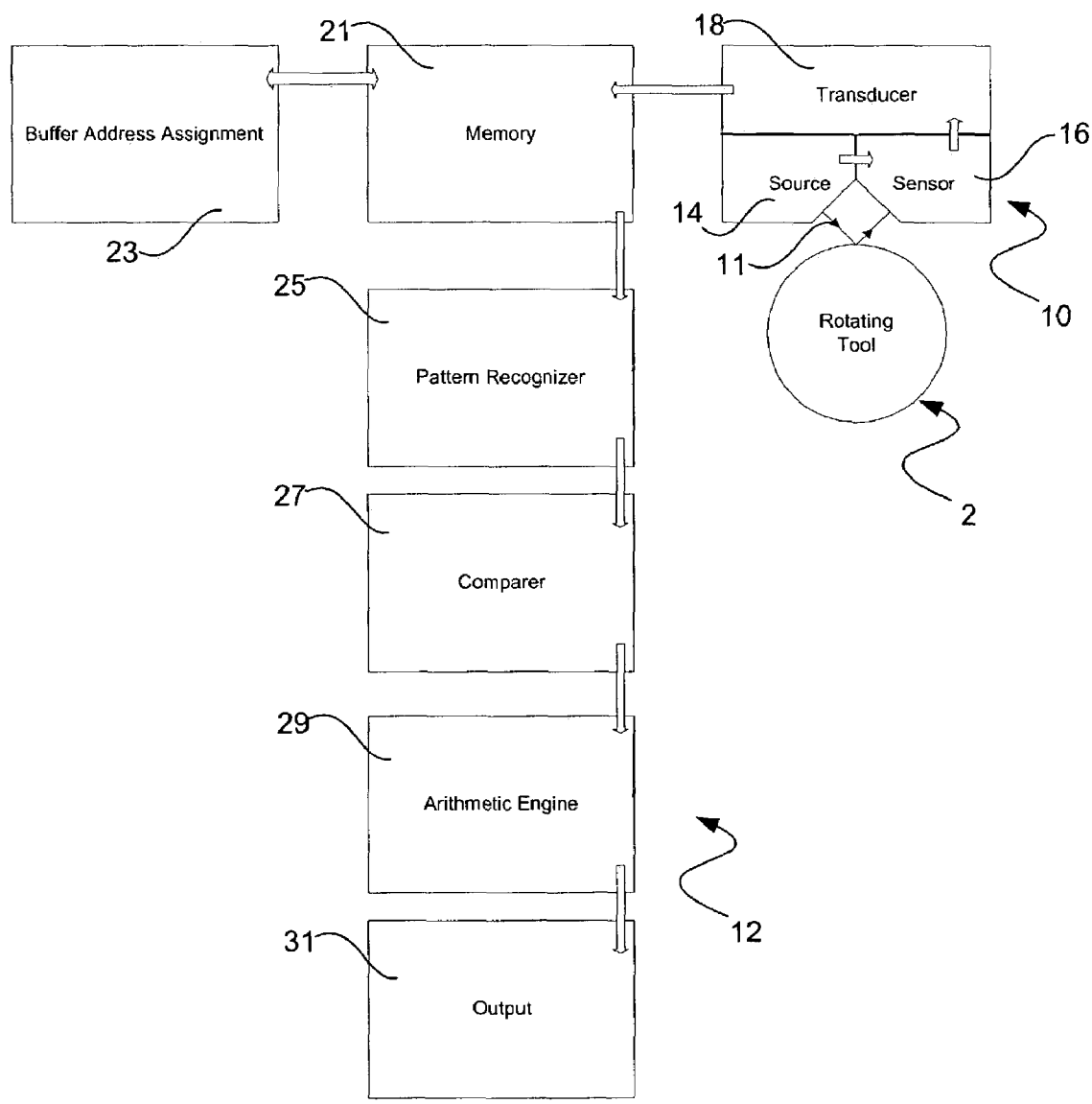
FIG. 3 is a block diagram of the system for determining runout of a rotating tool.

Referring now to FIGS. 1, 2, and 3, the rotating tool 2 is shown for illustrative purposes but is not a part of the system. The sensor head 10 described above includes three distinct components. The first component is a source 14. The source 14 generates the laser beam 11 in one presently preferred embodiment and directs the laser beam 11 at the tool 2.

A second component of the sensor head 10 is a sensor 16. The sensor 16 receives the beam as it is reflected from the rotating tool 2. Generally, the sensor 16 includes a lens (not shown) that focuses the reflected beam on a sensing device (not shown). Where the reflective beam strikes the lens determines the angle and position of a point at which the beam intersects the sensing device. In a presently preferred embodiment, the sensor 16 includes a capacitative charge device or CCD much like that employed in a video camera. The CCD includes a number of addressable pixels. The CCD can sense the position and strength of the beam strike at the addressable pixels located where the beam intersects the surface of the CCD. This information is then passed to a transducer 18.

Notably, the sensor head 10 can optionally serve as a fault indicator. Where the reading is either not detected or detected outside of a designated range, that reading will serve to notify the processor 12 of the absence of a rotating tool 2 or a fault in the CCD itself The transducer 18 receives the addresses and intensities of the pixels at the point where the beam intersects the surface of the CCD. The transducer 18 converts the information into a signal 19 that corresponds to the position of the beam intersecting the CCD. As the signal 19 need only represent the angular information corresponding to the position of the beam strike, an analog signal is advantageously employed in a preferred embodiment. Digital means may also be employed. The signal 19 generated by the transducer 18 is sent from the sensing head 10 to the processor 12.

The processor 12 includes a memory 21, a buffer address assignment 23, a pattern recognizer 25, a comparer 27, an arithmetic engine 29, and an output 31.

The signal 19 is stored in the memory 21, according to the buffer address assignment 23 generated to associate a received signal with a time the signal is received. The pattern recognizer 25 groups the received signals according to a pattern representing one period p. The pattern is discerned by either statistical means or is assisted by the presence of an indexing mark 4 generating a significantly lower value representing a local minimum 44. In either method, the pattern recognizer 25 groups a series of values to represent a single period p.

These values are then sent to the comparer 27 that does a sort to determine the minimum value 46 outside of the local minimum 44 and a maximum value 48. While there exist several means to perform the comparison statistically, one presently preferred embodiment allows these points to be selected graphically.

In the graphical comparison process, all of the measured values are charted as a function of time to create a tracing 41 placed on the screen 49. An operator, by suitable input means, places the point 53 at the minimum value outside of the local minimum 44. The operator further places the point 51 at the maximum value. Whether by statistical means or by graphical means, the minimum value at the point 53 and the maximum value at the point 51 are passed to the arithmetic engine 29.

The arithmetic engine 29 subtracts the minimum value at the point 53 from the maximum value at the point 51 to determine a runout r. Where the nature of the signal is not digital, the difference may appropriately be converted by further action of the arithmetic engine to determine a measurement value for r in units appropriate to the application.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A device for measuring runout of a rotating tool, the device comprising:
   a sensing unit including:
      a source of coherent electromagnetic radiation, the source being configured to direct the coherent electromagnetic radiation at a surface of a rotating tool having an axis, the surface of the rotating tool being displaced from the axis by a displacement;
      a sensor configured to receive reflected coherent electromagnetic radiation from the surface of the rotating tool such that the path of the reflected coherent electromagnetic radiation can be determined based upon the received coherent electromagnetic radiation; and
      a transducer configured to produce a signal representative of the determined path of the reflected coherent electromagnetic radiation;
   a processor in signal communication with the sensing unit, the processor being configured to receive the signal from the transducer;
   a memory in signal communication with the processor, the memory containing a program of instructions to be executed by the processor, the program being configured to instruct the processor to receive the signal, to determine a rotation period of the tool, and to record in the memory a digital measurement of instantaneous signal amplitude at a plurality of instants within the rotation period, the instants occurring at a sampling frequency, the digital measurements from the period being arranged in a temporally ordered sequence, the temporally ordered sequences being stored as a pane associated with the rotation period, each pane including an equal number of instants;
   an averaging filter configured to average corresponding instants across a plurality of panes to generate an averaged pane and
   an output device in signal communication with the processor and configured to indicate the determined displacement based upon the averaged pane.

2. The device of claim 1, wherein:
the output device is further configured to an average based upon a selected number of sequential panes.

3. The device of claim 2, wherein the processor determines from the plurality of digital measurements in a pane, a maximum displacement and a minimum displacement.

4. The device of claim 3, wherein the processor determines a runout based upon a difference between the maximum displacement and the minimum displacement.

5. The device of claim 2, further including an indexing mark on the surface of the rotating tool.

6. The device of claim 5, wherein the indexing mark is scribed into the surface.

7. The device of claim 5, wherein the indexing mark is a paper shim.

8. The device of claim 2, wherein the plurality is a first number and wherein the processor designates a second number that defines a pane for determining an average displacement, the second number being significantly less than the first number and greater than zero.

9. The device of claim 8, wherein the output is configured to graphically indicate each of the digital measurements of the averaged pane.

10. The device of claim 9, wherein the output is further configured to graphically indicate each of the digital measurements of any selected pane.

11. The device of claim 10, wherein the processor determines a runout based upon a selected pane.

* * * * *